United States Patent [19]

Eisenhuth

[11] Patent Number: 5,436,887
[45] Date of Patent: Jul. 25, 1995

[54] DIGITAL FULL-DUPLEX TRANSCEIVER

[75] Inventor: Robert B. Eisenhuth, Boulder, Colo.

[73] Assignee: Storage Technology Corporation, Louisville, Colo.

[21] Appl. No.: 10,773

[22] Filed: Jan. 29, 1993

[51] Int. Cl.$^6$ .......................... H04B 1/52; H04B 1/58
[52] U.S. Cl. ...................... 370/24; 370/27; 370/32
[58] Field of Search ................ 370/24, 31, 29, 41, 370/11, 100, 32, 27, 28; 375/36, 3, 7, 8, 98; 307/455, 494

[56] References Cited

U.S. PATENT DOCUMENTS

| | | | |
|---|---|---|---|
| 3,993,867 | 11/1976 | Blood, Jr. | 370/27 |
| 4,112,253 | 9/1978 | Wilhelm | 370/27 |
| 4,450,571 | 5/1984 | Hirayama et al. | 370/24 |
| 4,477,896 | 10/1984 | Aker | 370/24 |

Primary Examiner—Douglas W. Olms
Assistant Examiner—Ajit Patel
Attorney, Agent, or Firm—Sterne, Kessler, Goldstein & Fox

[57] ABSTRACT

The present invention provides a digital full-duplex line driver which allows digital information to be transmitted across a single bus simultaneously in both directions. The present invention accomplishes this by using both the voltage level on the bus and the current flowing through either a driver on one side of the bus or through the bus itself to decode the required information.

18 Claims, 7 Drawing Sheets

ALTERNATE PLACEMENT OF R2

DIGITAL FULL-DUPLEX TRANSCEIVER

BACKGROUND OF THE INVENTION

1. Field of the Invention

The present invention generally relates to bidirectional buses and, more particularly, to a full-duplex bidirectional bus which allows two digital chips to transmit information simultaneously in both directions over a single bus.

2. Related Art

Most digital systems use some type of high-traffic path for data transmission. This high-traffic path is typically called a bus. The bus is often used as a common connection between a number of locations or switching points. Busses are used in microprocessors to speed the data flow and transfer data, and for addressing and control. Voltage levels and impedances at the bus interface allow rapid transmission and minimize effects due to noise. A number of units can typically share the bus without excessive loading.

Bus drivers are power devices designed to supply signals to all devices on the bus without signal degradation. Bus drivers can transfer data in either a half-duplex mode or a full-duplex mode. Busses that operate in a half-duplex mode transfer data in both directions, but only one direction at a time. Two-way radio was the first technology to use half-duplex, for example, while one party spoke, the other party listened. This can be contrasted with full-duplex radio mode which transmits and receives data simultaneously, similar to a telephone or personal communication network (PCN). In pure digital networks full-duplex is typically achieved using two pairs of wires. In analog networks or in digital networks using carriers, it is typically achieved by dividing the bandwidth of the line into two frequencies (i.e., one carrier for sending in one direction and a second carrier for sending in the other direction). The idea of using one wire to send data in two directions between two devices is very useful. Sending data in two directions is typically done using tri-state drivers tied together on a single bus. Using a typical bidirectional bus, control signals and information signals have to be coordinated. It is then possible to transfer signals across the bus without interfering with one another.

FIG. 1 shows a high level block diagram of a full-duplex bidirectional bus. This basic configuration comprises two drivers 110 and 115 and a bus 120. In operation, an input at $A_{in}$ shows up at $A_{out}$. Likewise, an input at $B_{in}$ shows up at $B_{out}$. Note that the two signals do not have to be coordinated in an way.

Tying the outputs of the two drivers 110, 115 together form what is commonly called a wire-AND or a wire-OR bus. If one or both drivers 110, 115 are on they pull the voltage of the bus 120 to zero. Thus, if it is known that one driver is off, and the bus voltage is high, then it can be deduced that the other driver is off. Similarly, if one driver is off and the bus voltage is low, then it can be deduced that the other driver is on. If, however, driver A 110 (for example) is on, it cannot be determined what driver B 115 is doing since the voltage on the bus is low if one or both drivers 110, 115 are on. In other words, conventional systems that transfer data over a bus in full-duplex mode determine the state of the drivers by examining the voltage on the bus 110 to determine whether it is in a high or low state (i.e., examined with respect to two voltage levels). Thus, if the state of the second driver could not be determined, the first driver would be held inactive to determine the state of the second driver.

One conventional technique for performing full-duplex on a high speed bus line is manufactured and sold by Motorola (Dual Simultaneous Bus Transceiver, part number MC10194). The Motorola transceiver determines the different states of the bus using three different voltage levels. The Motorola device is an emitter coupled logic (ECL) circuit. As such, the bus consists of a current source at each end, each of which can be turned on or off. When both sources are off, the bus voltage is pulled to ground. When exactly one source is on, the bus voltage is pulled to an intermediate voltage, and when they are both on the voltage is pulled to the lowest voltage. By distinguishing among these three voltages, a driver can determine what the other driver is doing. One problem with this technique is a loss of noise immunity that comes from trying to distinguish between three voltage levels, as opposed to only two voltage levels (as done in conventional wire-AND gate buses).

Thus, a system and method is required for allowing full-duplex operation between two devices (i.e., allowing transfer of information over a single wire simultaneously in both directions) that provides relative immunity to noise.

SUMMARY OF THE INVENTION

The present invention provides a digital full-duplex line driver which allows digital information to be transmitted across a single bus simultaneously in both directions. The present invention accomplishes this by using both the voltage level on the bus and the current flowing through either a driver on one side of the bus or the bus itself to encode the required information. The drivers used by the present invention use bipolar or MOS transistors. When both drivers are off resistors pull the bus voltage to a high level. When one or more of these drivers are on, the bus voltage will be at a lower level. However, when just one driver is on the current through that driver will be higher than the current through it when more than one driver is on. Thus, the state of both drivers can be determined by examining the voltage level of the bus and the current flowing through the bus.

BRIEF DESCRIPTION OF THE DRAWINGS

The foregoing and other features and advantages of the invention will be apparent from the following more particular description of preferred embodiments of the invention, as illustrated in the accompanying drawings, in which.

DETAILED DESCRIPTION OF THE PREFERRED EMBODIMENT

Figure 1:
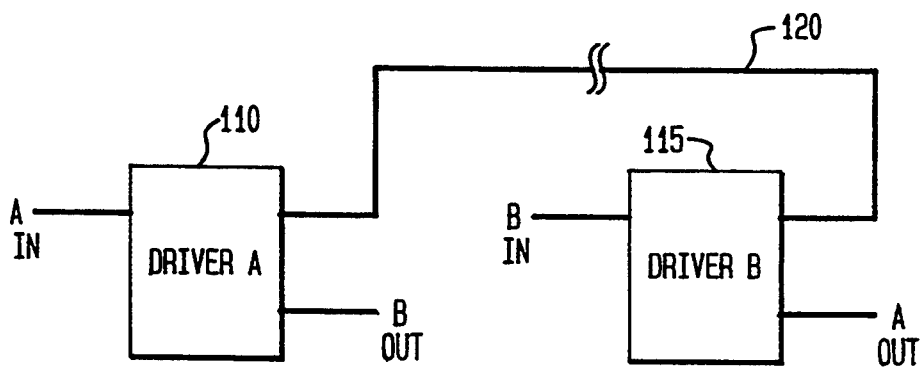
FIG. 1 shows a high level block diagram of a full-duplex bus.
Figure 2:
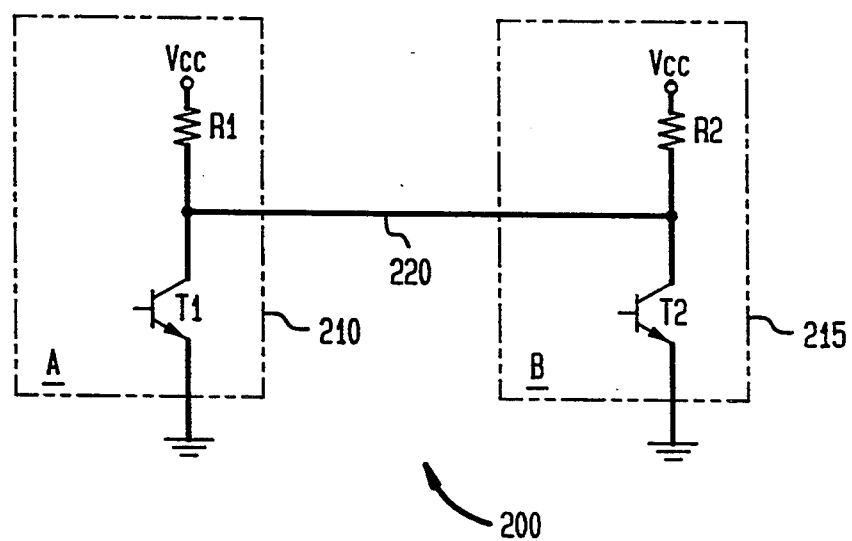
FIG. 2 shows an example of an open-collector bus.

FIG. 2 shows a schematic diagram of a TTL open-collector (wire-AND) bus 200. TTL open-collector bus 200 is a common example of such a wired-AND bus. The present invention is applicable to many other bus schemes as will become evident to those skilled in the art without departing from the scope of the present invention. Note that the circuit 200 could be convened to a wired-OR bus by using pnp transistors instead of npn transistors and using pull-down resistors instead of pull-up resistors. The open-collector bus 220 comprises final output transistors T1 and T2 of a pair of drivers 210, 215 coupled to bus 220. The collectors of the transistors T1 and T2 are connected to Vcc via a pair of resistors R1 and R2, respectively. When both drivers 210, 215 are off, the voltage of the bus 220 will be pulled high by the resistors R1, R2. When either of the drivers 210, 215 are on, the voltage on the bus 220 will be pulled low through the active transistor(s) T1, T2. The total current being pulled through the resistors R1, R2 will be constant if one or both of the transistors T1, T2 are on. However, if both transistors T1, T2 are on, then the current flowing through each transistor T1, T2 will be half the current that would flow through the active transistor if only one driver is on. It is this fact which the present invention employs to determine the state of the driver on the other end of the line.

In other words, the voltage on the bus 220 is pulled low if one or both drivers 210, 215 are on. As described in the background section, it can not be determined if only one of the drivers is on by only examining the high/low voltage on the bus 220. If an intermediate voltage level is checked, noise becomes a problem. Consequently, the current flowing through the transistors from Vcc can be checked to determine the state of the other driver. Since both drivers 210, 215 are substantially of the same type, if both drivers 210, 215 are on each pulls approximately half the current. There is thus virtuously no current flowing through the bus 220. Whereas, if driver A 210 is on and Driver B 215 is off, then driver A 210 is the only driver pulling the bus down, and it has to pull twice as much current. In other words, A is sinking twice as much current as it did in the first scenario. Thus, the present invention uses the voltage on the bus 220 and the current flow through the transistors T1, T2 to determine what the driver on the other side of the bus 220 is doing.

Figure 3A:
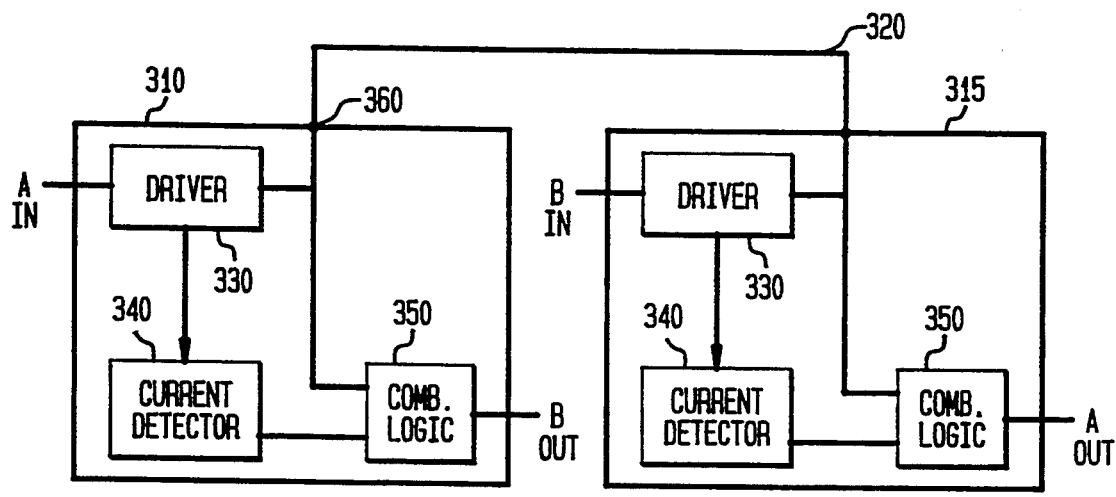
FIG. 3 shows a high level block diagram of the present invention.

FIG. 3(a) illustrates, in accordance with the present invention, a block diagram of a digital full-duplex transceiver 310, 315 (transceiver 310, 315 can also be referred to as a buffer). The transceiver 310, 315 is located on each end of a bus 320. Note that the bus 320 is a single wire. The transceiver 310, 315 decodes information from the bus 320 by examining both the voltage level on the bus 320 and the amount of current flowing through the driver 330 to permit simultaneous transmission of two signals. The transceiver 310, 315 includes a driver 330, a current detector 340, and combinational logic 350. The driver contains a wire-AND or a wire-OR type circuit. The current detector 340 senses the amount of current flowing through the driver 330. The threshold of the current detector 340 is between the low current when both drivers 330 are active and the high current when only one of the drivers 330 is active. The output of the current detector 340, along with the voltage level of the bus 320, are fed to combinational logic 350. Combinational logic 350 uses this information to deduce the value of the input to the driver 330 on the other end of the bus 320.

The driver 330 can both receive and transmit data simultaneously over the single bus 320. The driver 330 requires no control circuitry to enable or disable the driving function. Furthermore, since only one wire (as opposed to two wires) is required to allow two transceivers to transmit information simultaneously in both directions, the present invention reduces the number of I/O pins required on the chips housing the transceiver 310, 315.

Figure 3B:
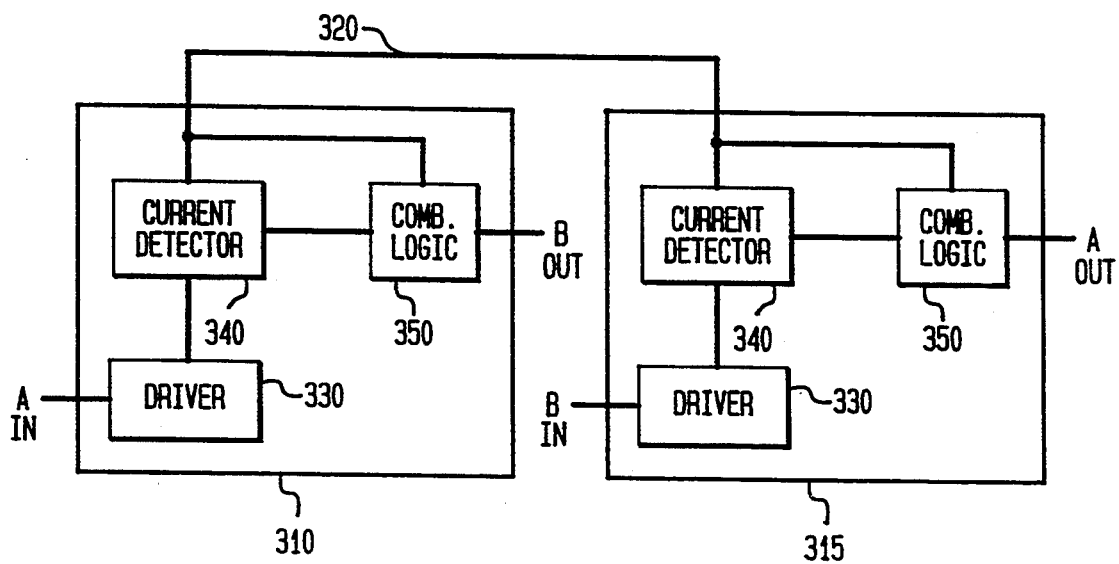

Note that the current can be sampled in two places. It can be sampled either by examining the current flowing through the driver 330 (as shown in a preferred embodiment illustrated in FIG. 3(a)), or it can be sampled by examining the current flowing through the bus 320. In the former, the current swing is between one and two units of current, and in the latter the current swing is between zero and one units of current. FIG. 3(b) shows the placement of current detector 340 for the latter scenario.

Also note that when the current detector 340 is measuring the current flowing through the bus 320, as is the case in FIG. 3(b), the pull-up resistance must be split between the two drivers 330 as shown in FIG. 2. However, if the current detector 340 is measuring the current through the driver, as in FIG. 3(a), the two resistances R1 and R2 could be combined into a single, possibly external resistor, as is commonly done with open-collector busses.

Figure 4A:
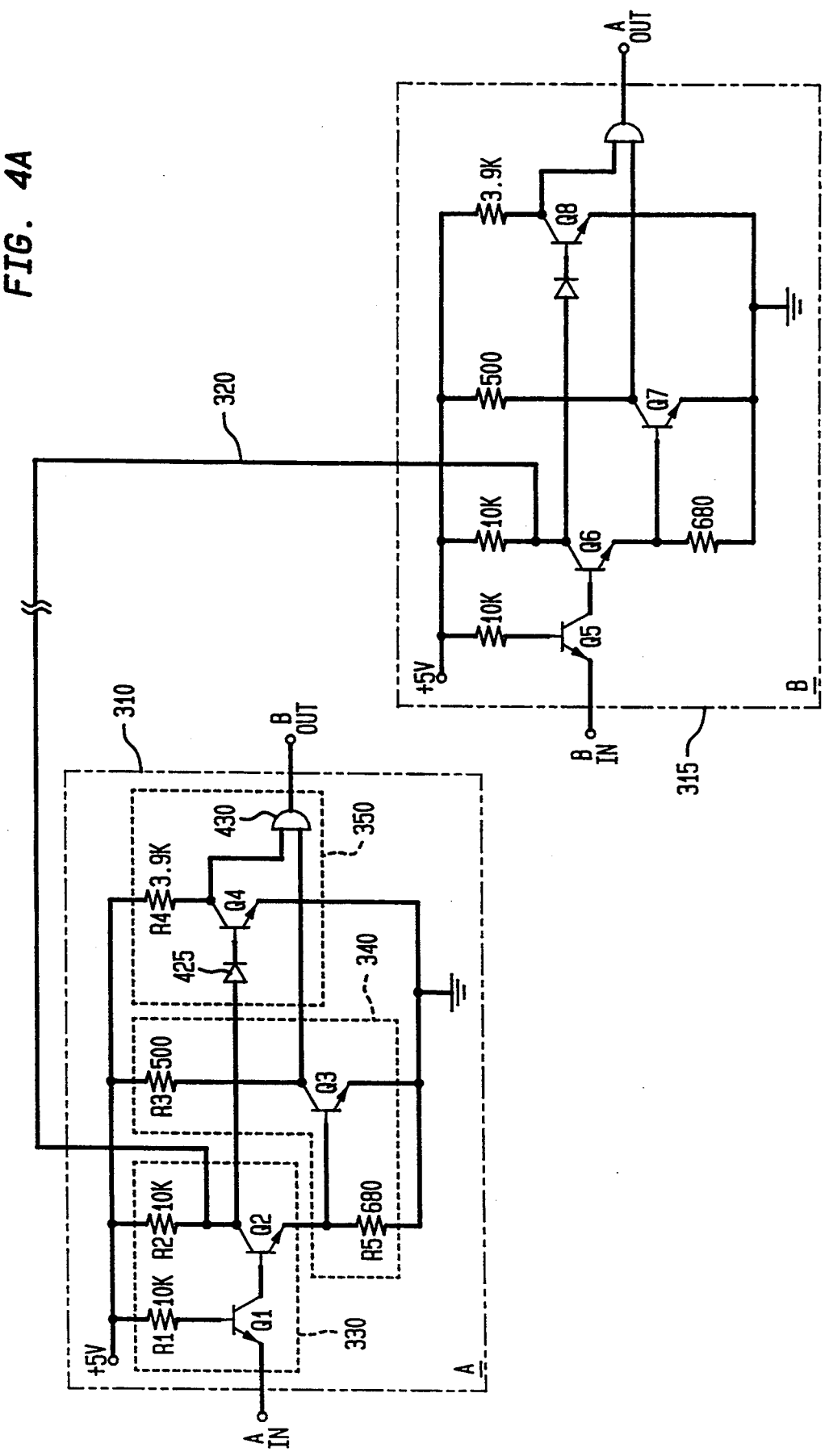
FIG. 4(a) shows a representative transistor level circuit diagram of a first embodiment of the present invention.

FIG. 4(a) shows a transistor level circuit diagram of the full duplex transceivers 310, 315 (shown in FIG. 3(a)). Only transceiver 310 will be described in detail since transceiver 315 is equivalent. Transceiver 310 comprises four transistors Q1–Q4, five resistors R1–R5, a diode 425, and an AND gate 430. The collectors of transistors Q2 and Q6 are coupled to the bus 320. Transistors Q1, Q2 and resistors R1, R2 form the driver 330. Driver 330 logically functions as an open-collector inverter. Transistor Q3 and resistors R3, R5 form the current detector 340. Transistor Q4, diode 425, resistor R4, and AND gate 410 form combinational logic 350. Transistor Q4 and resistor R4 form an inverter to compensate for the inverted voltage level from driver 330. Transistor Q3 has a voltage drop of 0.7 volts which raises the voltage level of the bus 320 the equivalent of a forward-biased diode voltage drop. The diode 425 is included in the combinational logic 350 to account for this raise in voltage level.

Resistor R2 is a pull-up resistor that pulls the bus voltage high when transistor Q2 is off. Values for resistors R3 and R5 are chosen so that transistor Q3 will switch on/off based on the high/low current flowing through transistor Q2. Representative resistor values are shown in the Figure. When transistor Q2 is pulling the high current (and thus pulling the bus 320 low by itself), transistor Q3 will switch on and its output voltage at its collector will go low. A low voltage level at transistor Q3's collector indicates that driver 330 in transceiver 315 is off. When transistor Q2 is only pulling one unit of current or transistor Q2 is off (thus indicating that driver 330 in transceiver 315 is on), transistor Q3 will switch off and the output voltage at its collector will go high.

The AND gate 430 driving $B_{out}$ has two inputs. The first is coupled to the collector of transistor Q4, and represents the (inverted) voltage on the bus 320. The second is coupled to the collector of transistor Q3, and represents the (inverted) high current flowing through driver 330. The resulting output of AND gate 430 indicates the current state of the input to transceiver 315 ($B_{in}$) on the other end of the bus 320. TABLE 1 illustrates the different states of transistors Q2–Q4, the bus voltage, current flowing through driver 330, the changing states of $A_{in}$ and $B_{in}$, and the output of AND gate 430 (i.e., $B_{out}$).

TABLE 1

| A in | B in | BUS VOLT. | Q4 OUT | Q2 CURRENT | Q3 OUT | B OUT |
|---|---|---|---|---|---|---|
| 0 | 0 | 1 | 0 | NONE | 1 | 0 |
| 0 | 1 | 0 | 1 | NONE | 1 | 1 |
| 1 | 0 | 0 | 1 | HIGH | 0 | 0 |
| 1 | 1 | 0 | 1 | LOW | 1 | 1 |

The operation of transceiver 310 will be described next (reference can be made to TABLE 1). If $A_{in}$ is low and $B_{in}$ is low the bus voltage is high since neither transceiver 310, 315 is pulling the voltage on the bus 320 down. Additionally, there is no current flowing through transistor Q2 (i.e., driver 330). $B_{out}$ is thus "0".

If $B_{in}$ goes high the bus voltage is pulled to zero. Transistor Q4 inverts this voltage and produces a "1" at its collector (output). There is still no current flowing across transistor Q2 since $A_{in}$ is low. When there is no current flowing across transistor Q2, transistor Q3 is turned off. Thus, the voltage level at the collector (output) of transistor Q3 is "1". Since both inputs to AND gate 430 are "1", $B_{out}$ is also a "1".

If $A_{in}$ goes high and $B_{in}$ goes low the bus voltage is still pulled to zero. Transistor Q4 inverts this voltage and produces a "1" at its collector (output). The current flowing across transistor Q2 is high thus turning on transistor Q3. The voltage level at the collector (output) of transistor Q3 is thus "0". Since only one of the inputs to AND gate 430 is a "1", $B_{out}$ is a "0". This indicates that transceiver 315 is transmitting a "0".

If $B_{in}$ now goes high the bus voltage will remain at zero. Transistor Q4 inverts this voltage and produces a "1" at its collector (output). The current flowing across transistor Q2 is low thus turning off transistor Q3. The voltage level at the collector (output) of transistor Q3 is thus "1". Since both inputs to AND gate 430 is a "1", $B_{out}$ is a "1". This indicates that transceiver 315 is transmitting a "1".

Figure 4B:
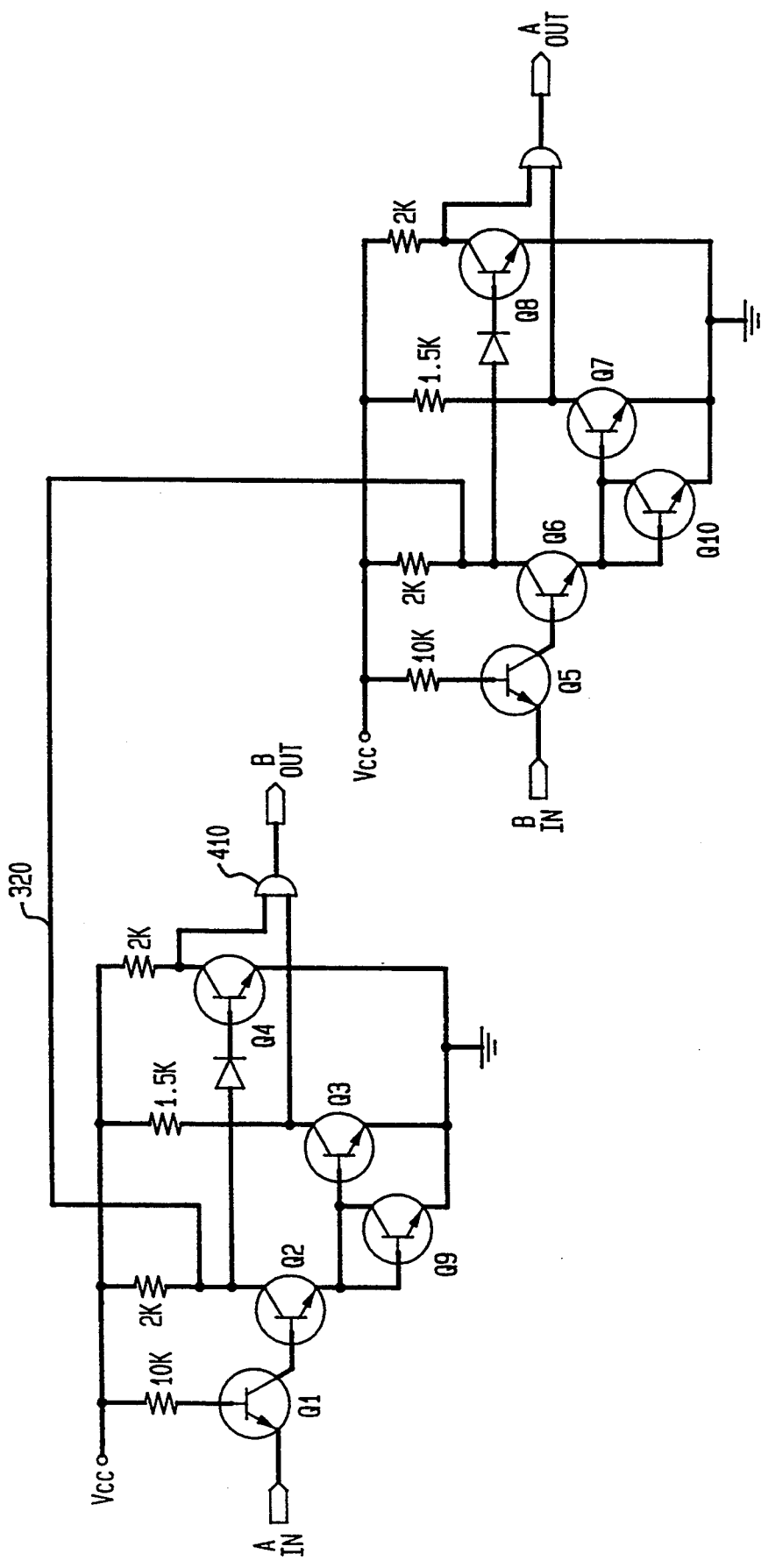
FIG. 4(b) shows a representative transistor level circuit diagram of a second embodiment of the present invention.

FIG. 4(b) shows an alternate embodiment for the full-duplex transceiver 310, 315. Resistor R5 can be replaced with a transistor Q9. Thus, current detector 340 comprises transistors Q3 and Q9 and resistor R3. The operation of the circuit shown in FIG. 4(b) is substantially the same as that described above. Table 1 also illustrates the different states of the transistors, the bus voltage, current flowing through driver 330, and the changing states of $A_{in}$ and $B_{in}$.

Transistors Q3 and Q9 connected as shown in FIG. 4(b) comprise what is known as a current mirror. This will cause the collector current on transistor Q3 to be approximately equal to the emitter current coming out of transistor Q2. The current swing through transistor Q3, which is effectively the same as the current swing through transistor Q2, is translated to a voltage swing by resistor R3. This method of converting the current through the driver 330 to a voltage level is much more reliable than that in FIG. 4(a), which is very sensitive to the value of resistor R5.

Figure 5A:
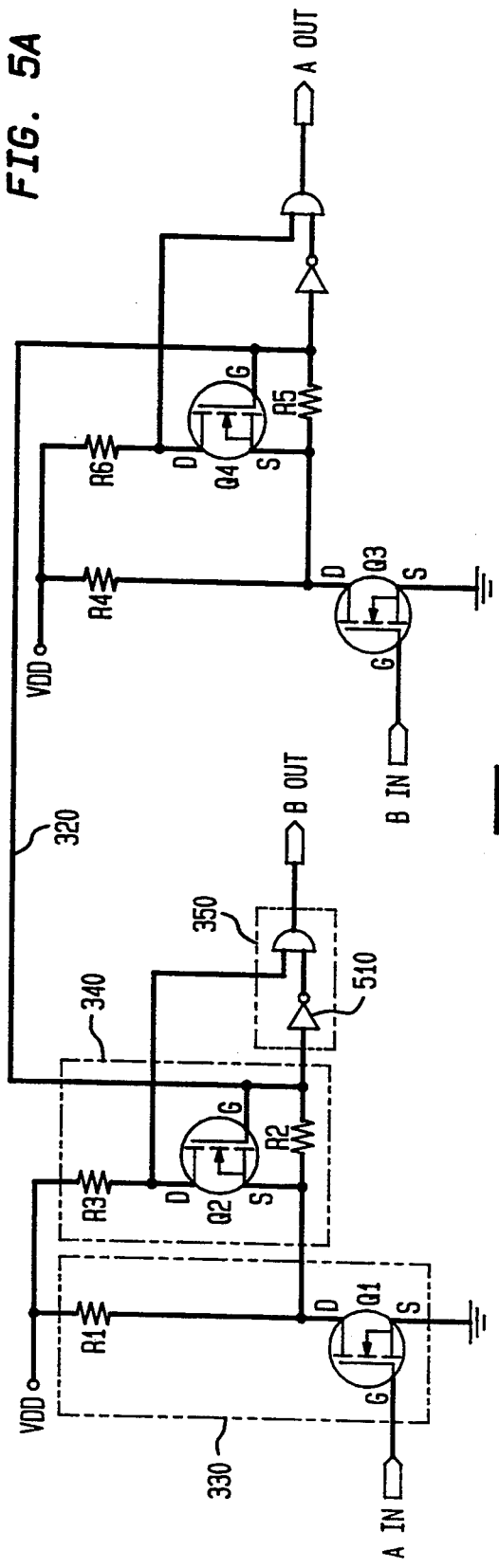
FIG. 5(a) shows a first embodiment of a representative MOS implementation of the full-duplex bidirectional transceiver shown in FIG. 3.

FIG. 5(a) shows an implementation of the full-duplex buffer 310, 315 using MOS devices. In particular, the circuit uses n-channel FET transistors. The circuit can be implemented equally well using NMOS or CMOS technology. Similarly, the circuit could use p-channel FET transistors, and it could be implemented equally well using CMOS or PMOS technology.

As discussed above, there are two places the current can be sampled. The MOS embodiments shown in FIGS. 5(a) and 5(b) show an example of sampling the current flowing through the bus 320 (as illustrated in the high level block diagram of FIG. 3(b)).

The n-channel FET Q1 and the resistor R1 are a typical open-drain (wire_AND) driver. All of the current flowing through the bus must also flow through resistor R2, which translates that current into a voltage level. That voltage will turn on or off transistor Q2, which with resistor R3 forms an inverter. The combination of resistor R2, transistor Q2, and resistor R3 make up the current detector 340. The bus 320 and the output from the current detector 340 connect to the combinational logic 350 as in the TTL version. The operation of this embodiment is substantially the same as described above for the TTL embodiment.

Figure 5B:
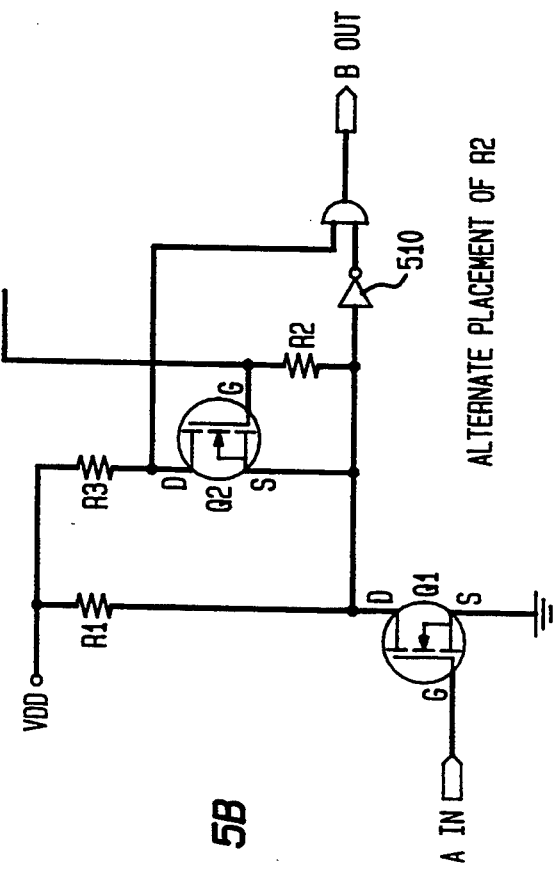
FIG. 5(b) shows a second embodiment of a representative MOS implementation of the full-duplex bidirectional transceiver shown in FIG. 3.

FIG. 5(b) shows an alternate embodiment of the full-duplex buffer 310, 315 shown in FIG. 5(a). The input to the invertor 510 is taken off the other side of resistor R2. This is very similar to the embodiment shown in FIG. 5(a), but the voltage range on the input to the invertor 510 is different. There are some tradeoffs on noise margin, depending on the resistor values and transistor switching thresholds.

The glitch problem will be described with reference to FIG. 4(b). When $B_{in}$ is held constant, the output $B_{out}$ should also remain constant regardless of what is happening at $A_{in}$. However, because of unequal delays, the output can glitch under certain conditions. Once again, the AND gate 430 driving $B_{out}$ has two inputs. The first input comes from Q4, and represents the (inverted) voltage on the bus 320. The second input comes from Q3, and represents the (inverted) high current flowing through driver 330.

Figure 6:
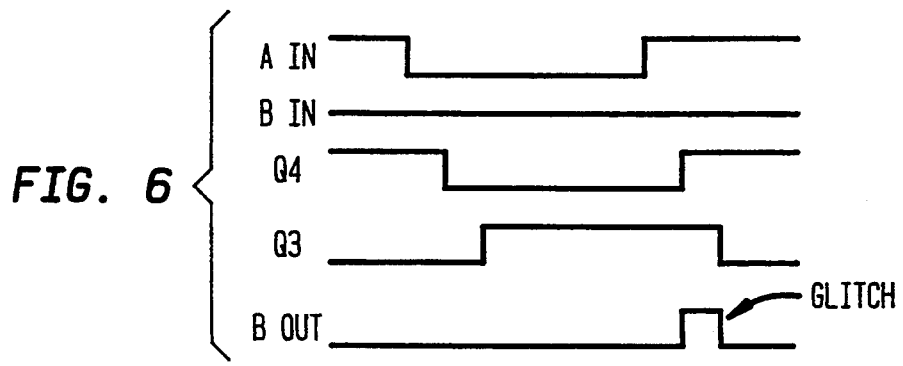
FIG. 6 is a timing diagram that illustrates a possible glitch problem with the switching of transistor Q4.

Referring to the timing diagram shown in FIG. 6, assume that Q4 switches before Q3. When $B_{in}$ is low, Q3 and Q4 will be in opposite states. When $A_{in}$ switches, both Q3 and Q4 switch. When $A_{in}$ falls, Q4 falls (because Q4 represents the inverted high voltage level) and then Q3 rises. The AND gate 430 maintains a "0" on its output. However, when $A_{in}$ rises, Q4 rises and then Q3 falls, causing a temporary "1" on $B_{out}$.

Generally, the problem can be fixed with proper use of controlled delays and logic gates, and possibly even with asymmetrical rise and fall delays. Solving this problem is also referred to as removing the logic hazard caused by unequal delays of the switching of the inputs to the combinational logic 350. Described below are some practical solutions to the delay problem.

Figure 7:
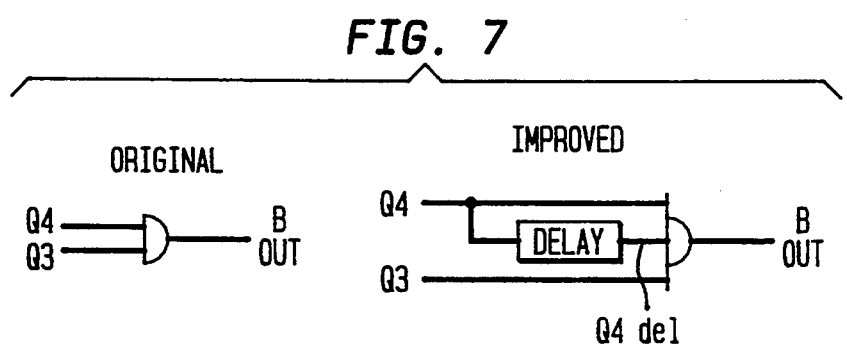
FIG. 7 shows a representative first solution to the glitch problem associated with signal Q4 as illustrated in FIG. 6.
Figure 8:
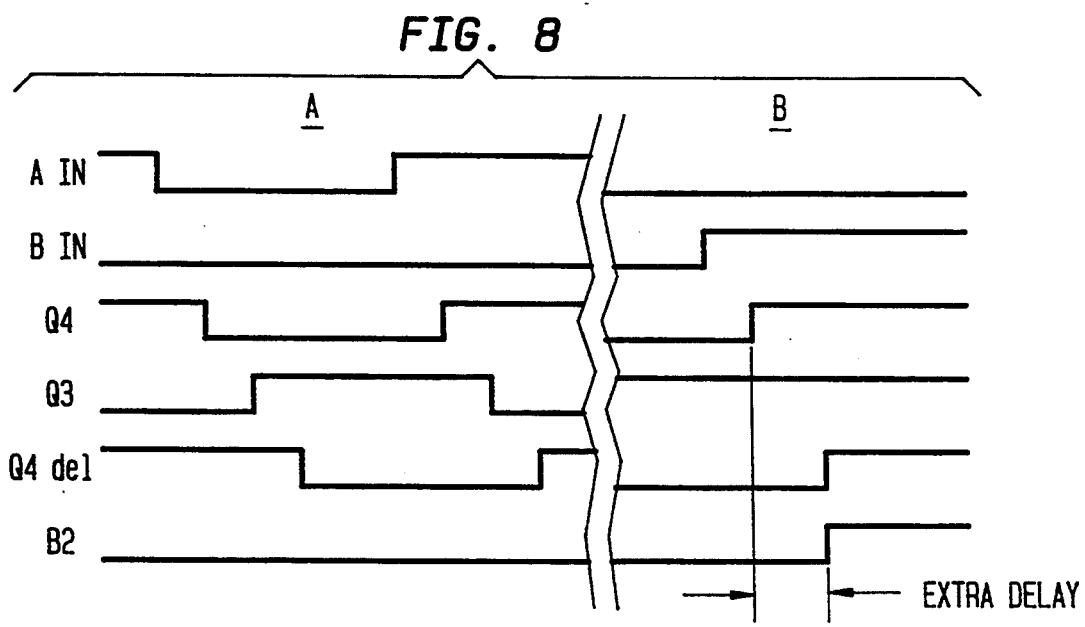
FIG. 8 is a timing diagram that illustrates a problem with the first solution shown in FIG. 7.

The first improvement, as shown in FIG. 7, is to generate a delayed signal $Q4_{del}$ which follow Q4 but switches after Q3. As FIG. 8 shows, in the same situation as before, when $A_{in}$ rises $Q4_{del}$ maintains a "0" on the input to the AND gate 430 until after Q3 has switched, keeping B2 at a constant "0".

There is a problem, however, with this solution. The added delay in the $Q4_{del}$ signal increases the propagation delay from $B_{in}$ to $B_{out}$ in some cases, as shown in FIG. 8. When $A_{in}$ is low and $B_{in}$ switches from low to high, the output $B_{out}$ cannot switch in until $Q4_{del}$ switches, which is later than $B_{out}$ would switch in the original design. So this solution eliminates the glitch with a low cost in circuity, but it adds delay to the path.

Figure 9A:
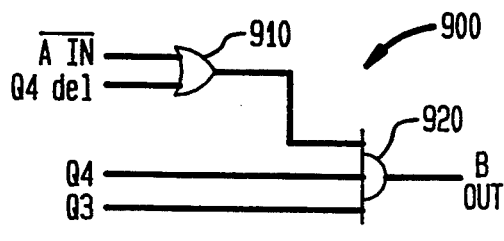
FIGS. 9(a) and 9(b) show a representative second solution to the glitch problem associated with signals Q4 as illustrated in FIG. 6.

A slightly more complex solution eliminates the glitch but does not add the extra delay to the path (although the extra logic gates may add some delay, depending on the implementation). The basic principle is to use signal $A_{in}$ to enable the $Q4_{del}$ signal only when we want it to affect the circuit (i.e., when we are trying to remove the glitch). Otherwise, $A_{in}$ will degate $Q4_{del}$, and the logic will pass signals from $B_{in}$ as in the original design. FIG. 9(a) illustrates the combinational logic for this solution. It includes an OR gate 910 having inverted $A_{in}$ and $Q4_{del}$ as inputs, and an AND gate 920 having the output of the OR gate 910 and signals Q3 and Q4 as inputs. The resulting output is $B_{out}$.

Figure 9B:
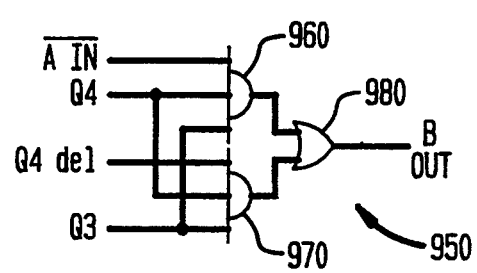
Figure 10:
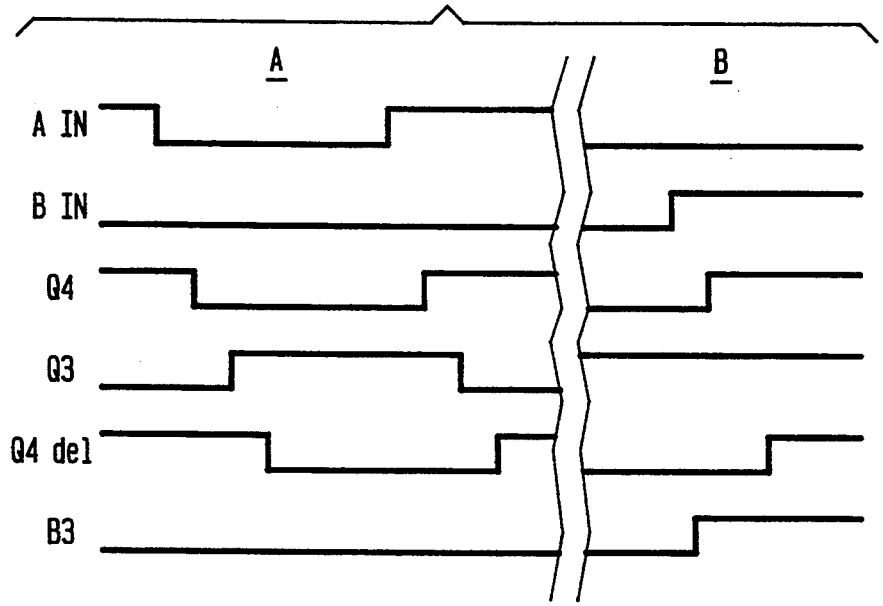
FIG. 10 is a timing diagram that illustrates the operation of circuits 910 and 950 illustrated in FIG. 9.

FIG. 9(b) shows the same function implemented slightly differently. For circuit 950 to function properly, the signals must switch in the following order: $A_{in}$, Q4, Q3, $Q4_{del}$. For circuit 900 to function properly, there is the additional requirement that when $A_{in}$ switches, the output of OR gate 910 must switch before Q4 (and Q3 and $Q4_{del}$). FIG. 10 shows how the new improvement behaves under the same conditions as the first solution shown in FIG. 8.

Figure 11:
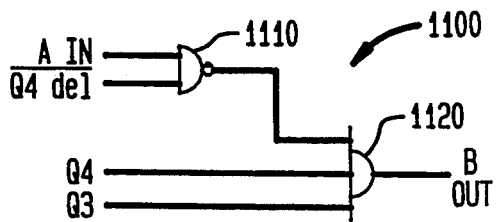
FIG. 11 shows a preferred embodiment of the second solution to the glitch problem.

A preferred embodiment used for glitch removal in the TTL embodiment is shown in FIG. 11. It includes a NAND gate 1110 having $A_{in}$ and inverted $Q4_{del}$ as an input, and an AND gate 1120 having the output of NAND gate 1110 and signals Q4 and Q3 as an input. The resulting output is $B_{out}$.

Figure 12:
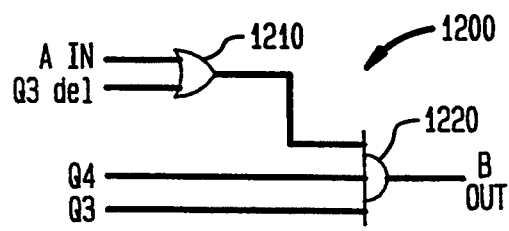
FIG. 12 shows a preferred embodiment of a solution to the glitch problem associated with signal Q3 as illustrated in FIG. 6.

Finally, if signal Q3 happened to switch faster than Q4, then the same process could be used to remove the glitch. Thus, a delayed version of Q3, called $Q3_{del}$ (which would have to switch after Q4) could be used to remove the glitch. The resulting circuit 1200 is shown in FIG. 12. It includes OR gate 1210 having $A_{in}$ and $Q3_{del}$ as inputs, and an AND gate 1220 having the output of the OR gate 1210 and signals Q4 and Q3 as inputs. The resulting output if $B_{out}$.

While embodiments of the present invention have been described above, it should be understood that they have been presented by way of example only, and not limitation. Thus, the breadth and scope of the present invention should not be limited by any of the above described embodiments, but should be defined only in accordance with the following claims and their equivalents.

What is claimed is:

1. A full-duplex transceiver, comprising:
   (a) a first driver coupled to a bus, wherein said first driver is configured to transmit information;
   (b) a current detector, coupled to said first driver, operable to detect the amount of current flowing through said first driver and for outputting a value indicative of said detected current; and
   (c) combinational logic, coupled to said bus and said current detector, operable to detect a voltage level of said bus and determine a value of an input to a second driver by evaluating said outputted value of said current detector and said voltage level of said bus, wherein said second driver is coupled to said first driver via said bus.

2. The transceiver of claim 1, wherein said first driver, said current detector, and said combinational logic comprise bipolar transistors.

3. The transceiver of claim 1, further comprising delay means for removing logic hazard of said combinational logic by forcing the input to said combinational logic to arrive in an appropriate order.

4. The transceiver of claim 1, wherein said current detector comprises a transistor, a first resistor, and a second resistor, wherein a base of said transistor is connected to said driver, said base and an emitter of said transistor are connected via said first resistor, said emitter of said transistor is connected to ground, and a collector of said transistor is connected to a voltage source via said second resistor.

5. The transceiver of claim 1, wherein said current detector comprises a first transistor, a second transistor and a resistor, wherein a base of said first transistor is connected to said driver, said base and a collector of said second transistor are connected to a base of said first transistor, an emitter of said second transistor is connected to an emitter of said first transistor both of which are connected to ground, and said resistor is connected between a voltage source and said collector of said first transistor.

6. The system of claim 1, wherein said combinational logic comprises a transistor, a resistor, a diode, and an AND gate, wherein a collector of said transistor is connected to a voltage source via said resistor, a base of said transistor is connected via said diode to said bus, an emitter of said transistor is connected to ground, wherein said AND gate has a first input connected to said current detector and a second input connected to said collector of said transistor, wherein an output of said AND gate indicates said value of said input to said second driver.

7. The transceiver of claim 6, further comprising delay means for removing logic hazard associated with switching said first and second inputs to said AND gate.

8. In a system comprising a bus connecting at least two devices together, wherein each of said at least two devices contain a full-duplex transceiver operable to simultaneously transmit and receive information across said bus, each full-duplex transceiver comprising:
   (a) a first driver coupled to a bus, wherein said first driver is configured to transmit information;
   (b) a current detector, coupled to said first driver, operable to detect the amount of current flowing through said first driver and/or said bus and for outputting a value indicative of said detected current; and (c) combinational logic, coupled to said bus and said current detector, operable to detect a voltage level of said bus and determine the value of an input to a second driver by evaluating said output of said current detector and said voltage level of said bus, wherein said second driver is coupled to said first driver via said bus.

9. A full-duplex transceiver, comprising:
(a) a current detector, coupled to a bus, operable to sense the amount of current flowing through said bus and for outputting a value indicative of said detected current;
(b) a first driver coupled to said bus, wherein said first driver is configured to transmit information; and
(c) combinational logic, coupled to said bus and said current detector, operable to detect a voltage level of said bus and determine the value of an input to a second driver by evaluating said output of said current detector and said voltage level of said bus, wherein said second driver is coupled to said first driver via said bus.

10. The transceiver of claim 9, wherein said first driver, said current detector, and said combinational logic comprise field effect transistors.

11. The transceiver of claim 9, further comprising delay means for removing logic hazard of said combinational logic by forcing the input to said combinational logic to arrive in an appropriate order.

12. The transceiver of claim 9, wherein said current detector comprises a field-effect transistor having,
a gate electrode connected to said bus,
a drain electrode coupled to a voltage potential via a first resistor, and
a source electrode connected to said bus via a second resistor.

13. The transceiver of claim 9, wherein said combinational logic comprises an AND gate having a first and a second input and an output, said first input is connected to said current detector and said second input is connected to the bus via an inverter, whereby said output represents an input to said second driver.

14. In a system comprising a bus connecting two devices together, wherein each of said two devices includes a full-duplex transceiver operable to simultaneously transmit/receive information across/from said bus, each full-duplex transceiver comprising:
an input for receiving information for transmission to the other full-duplex transceiver;
a first transistor having an emitter connected to said input and a base connected to a voltage source via a first resistor;
a second transistor having a base connected to a collector of said first transistor, and having a collector connected to the bus and to said voltage source via a second resistor;
a third transistor having a base connected to an emitter of said second transistor, and having a collector connected to said voltage source via a third resistor;
a fourth transistor having a base and a collector connected to said base of said third transistor, and having an emitter connected to an emitter of said third transistor and to ground;
a fifth transistor having a base connected via a diode to said collector of said second transistor, an emitter connected to said emitter of said third transistor and to ground, and a collector connected to said voltage source via a fourth resistor; and
an AND gate having a first input connected to said collector of said fifth transistor and a second input connected to said collector of said third transistor, and having an output, whereby said output represents an input to another device on the other end of the bus.

15. In a system comprising a bus connecting two devices together, wherein each of said two devices includes a full-duplex transceiver operable to simultaneously transmit/receive information across said bus, each full-duplex transceiver comprising:
an input for receiving information for transmission to the other full duplex transceiver;
a first field-effect transistor having,
a first gate electrode connected to said input,
a first drain electrode connected to a first voltage potential via a first resistor and to the bus via a second resistor, and
a first source electrode connected to a second voltage potential;
a second field-effect transistor having,
a second gate electrode connected to the bus;
a second drain electrode coupled to said first voltage potential via a third resistor, and
a second source electrode connected to said first drain electrode of said first field-effect transistor and connected to the bus via said second resistor;
an AND gate having a first and a second input and an output, said first input connected to said second drain electrode of said second field-effect transistor and said second input is connected to the bus via an inverter, whereby said output represents an input to another device on the other end of the bus.

16. In a transceiver, a method for simultaneously transmitting and receiving information across a single electrically conductive channel, the method comprising the steps of:
transmitting information onto the channel using a first driver, said first driver coupled to the channel at a first location; and simultaneously
receiving further information from a second driver coupled to the channel at a second location, said receiving step comprising the steps of,
detecting a voltage of the channel;
detecting a current flowing through said first driver and/or the channel; and
providing an output, based on said voltage and said current, indicative of said further information transmitted by said second driver.

17. The method of claim 16, wherein said transmitting step further comprises the step of applying an input to said first driver which in turn changes the voltage and/or current level of the channel.

18. The method of claim 16, wherein said providing step comprises the steps of:
determining whether said voltage is at a first level, wherein if said voltage is at said first value then neither of said first and second drivers have a first value at their inputs;
determining whether said voltage is at a second level, wherein if said voltage is at said second level one of said first and second drivers has said first value at their inputs;
determining whether said current is at a first magnitude, wherein if said current is at said first magnitude then only said first driver has said first value at its input, and thus said second driver has a second value at its input; and
determining whether said current is at a second magnitude, wherein if said current is at said second magnitude then said second driver has said first value at its input.

* * * * *